United States Patent

Julian

[11] Patent Number: 6,130,832
[45] Date of Patent: Oct. 10, 2000

[54] ACTIVE FILTERING OF AC/DC SWITCHED CONVERTER INPUT CURRENT

[75] Inventor: Alexander L. Julian, Vernon, Conn.

[73] Assignee: Otis Elevator Company, Farmington, Conn.

[21] Appl. No.: 09/435,584

[22] Filed: Nov. 8, 1999

[51] Int. Cl.[7] .................................................. H02M 7/217
[52] U.S. Cl. .............................................. 363/127; 363/44
[58] Field of Search .............................. 363/87, 127, 125, 363/39, 44, 47, 48; 323/210, 209, 208, 207, 205

[56] References Cited

U.S. PATENT DOCUMENTS

| | | | |
|---|---|---|---|
| 5,567,994 | 10/1996 | Davis et al. | 363/39 |
| 5,751,138 | 5/1998 | Venkata et al. | 323/207 |
| 6,038,152 | 3/2000 | Baker | 363/89 |

OTHER PUBLICATIONS

H. Fujita & H. Akagi, "An Approach to Harmonic Current–Free AC/DC Power Conversion for Large Industrial Loads: The Integration of a Series Active Filter with a Double–Series Diode Rectifier", IEEE Trans. Ind. Applicat., vol. 33, pp. 1233–1240, Sep./Oct. 1997.

*Primary Examiner*—Shawn Riley
*Assistant Examiner*—Gary L. Laxton

[57] ABSTRACT

An active inductor for controlling transistor bridge switching carrier frequency current components in the power mains connected to a three-phase AC/DC switched bridge converter includes a transformer for each phase, each having a secondary between the AC main and the switched bridge, the primary of which is driven by a bridge switched at much higher frequency in response to a synthesized waveform which ideally will completely cancel the main power bridge switching current components. Reduction of the current carrying requirement of the active inductor is achieved by providing negative feedback of the fundamental power frequency from the primary of each transformer; deviations in the synthesized waveform from the ideal waveform, due to delays and distortions in real circuits and/or processing, are reduced by providing negative feedback from the resultant current (the secondary of the active filter transformer).

15 Claims, 5 Drawing Sheets

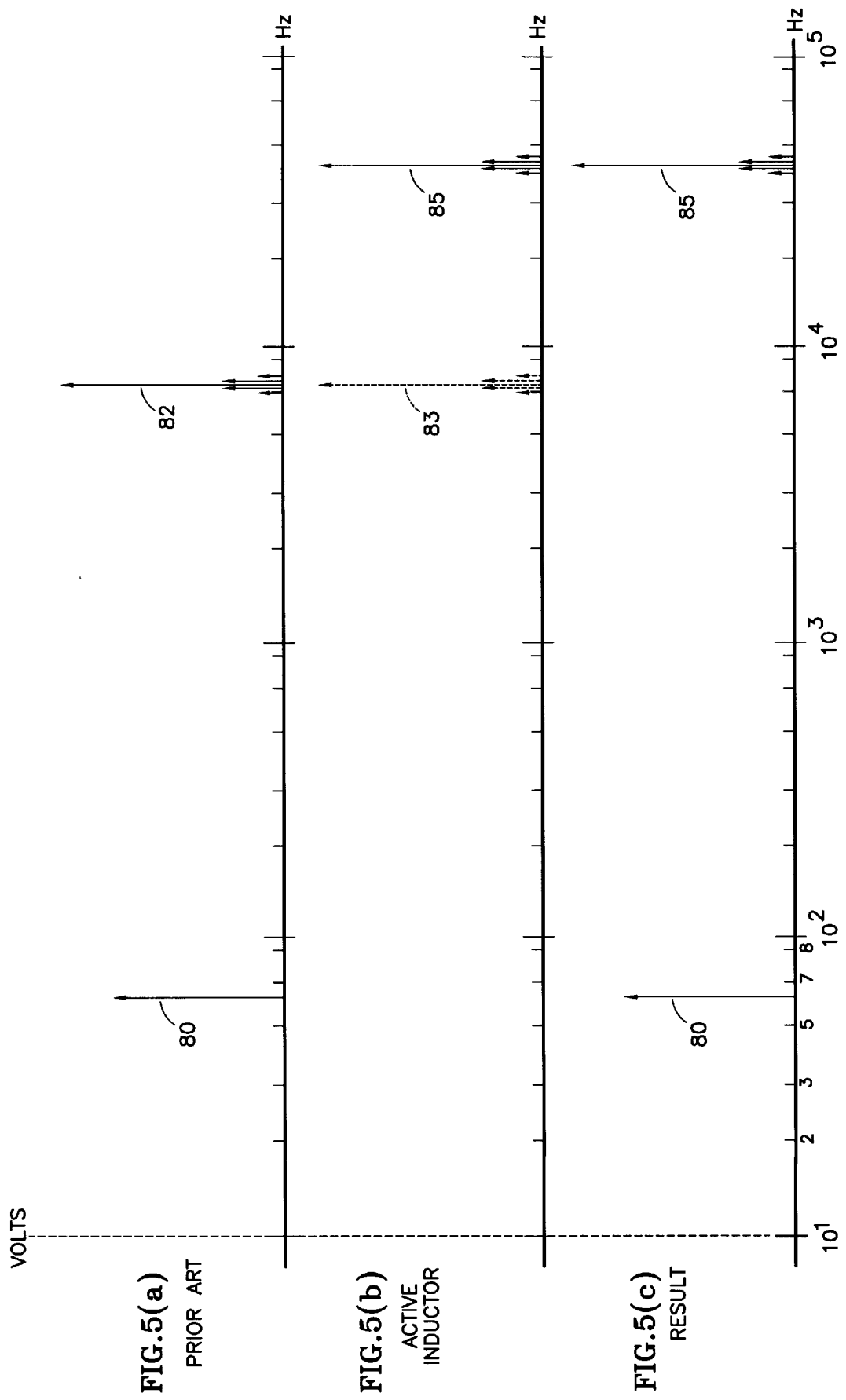

6,130,832

ACTIVE FILTERING OF AC/DC SWITCHED CONVERTER INPUT CURRENT

TECHNICAL FIELD

This invention relates to reducing switching carrier frequency currents in the power mains connected to an AC/DC switched converter.

BACKGROUND ART

Standard recommended practices establish limits on the magnitude of non-sinusoidal current components which can be present in the current flow between a power grid (the AC mains) and a power-consuming apparatus. An example of a power-consuming apparatus which generates significant unwanted power current components is illustrated in FIG. 1. Therein, a load 11 may, for instance, comprise a DC elevator motor. The load is supplied DC voltage on a bus comprising a positive rail 12 and a negative rail 13, the voltage being developed within large electrolytic capacitors forming a capacitor bank 14. Power is supplied from the three-phase AC mains 17–19 (the utility power grid) through an LC input filter 22 which includes three series inductors 23 and three parallel capacitors 24. Power is switched from the AC mains into the capacitor 14 by a solid state, switched bridge converter 26, which may comprise, for instance, six insulated gate bipolar transistors (IGBTs) and reverse diode pairs 27–32. The switches 27–32 may be controlled by any one of a number of conventional gate drive circuits. However, since the switches operate at frequencies much higher than the 50 or 60 Hertz power frequency, the switching introduces unwanted components at the switching carrier frequency and sidebands thereof into the current flowing between the switches and the AC mains. In order to reduce the unwanted current components to levels which meet established limits, large reactive filters 35–37 are placed in series with the switches. In large installations, such as an elevator drive, the reactive filters 35–37 are very costly and may exceed 200 pounds, for instance.

DISCLOSURE OF INVENTION

Objects of the invention include reducing the weight of line filters in high power AC/DC converters by about two thirds while still meeting established limits on switching components in the current; providing an AC/DC converter which costs less than one implemented with passive reactive filters; damping of input resonance in a switching AC/DC converter; reduction of switching current components in the input of a switched AC/DC converter.

This invention is predicated on the concept that unwanted switching voltages produced by the switches in an AC/DC converter can be cancelled by substantially identical voltages introduced in series therewith. This invention is further predicated on the concept that the control loop that generates the voltage used to cancel the unwanted voltage components need not have high current-carrying capability if the fundamental current component (usually 50 Hertz or 60 Hertz) is minimized in the control loop.

According to the present invention, switching carrier current components in a three-phase AC main feeding an AC/DC switched bridge converter are controlled by synthesizing a voltage waveform for each phase, each waveform being substantially identical to the waveform of the switching carrier frequency voltage generated by the related phase of said converter, such synthesized voltage waveform being introduced in series with the corresponding switching carrier voltage but 180° out of phase therewith, to substantially cancel said switching carrier voltage. According further to the invention, the synthesis is responsive in part to bridge switching control signals and the converter DC output, and in part to the input phase voltages in stationary coordinates. In accordance with the invention, high pass feedback of the AC main currents compensates for deviations of the synthesized voltage waveforms from the ideal waveforms. In accordance further with the invention, low pass feedback of the synthesized voltage waveforms reduces the fundamental components in the control loop, thereby lowering the current-carrying requirement of (derating) the control loop.

An active filter of the invention dampens input resonance current components and reduces the size of passive input filters by about two thirds from the size required in prior art converters, while maintaining levels of switching current components in the AC mains which meet established limits.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 5 is a frequency spectrum diagram illustrating the invention.

BEST MODE FOR CARRYING OUT THE INVENTION

Figure 1:
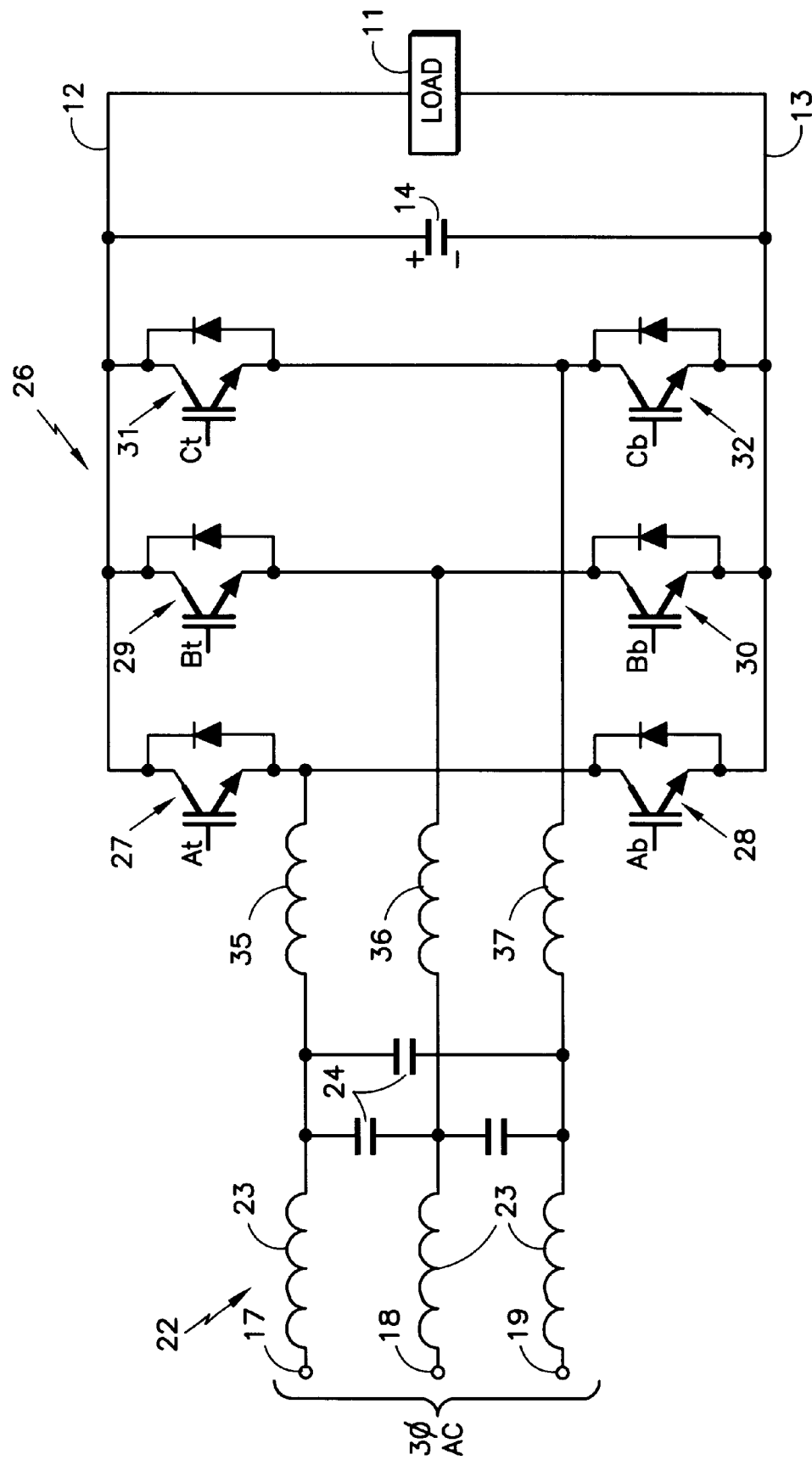
FIG. 1 is a schematic block diagram of a switched AC/DC converter known to the prior art.
Figure 2:
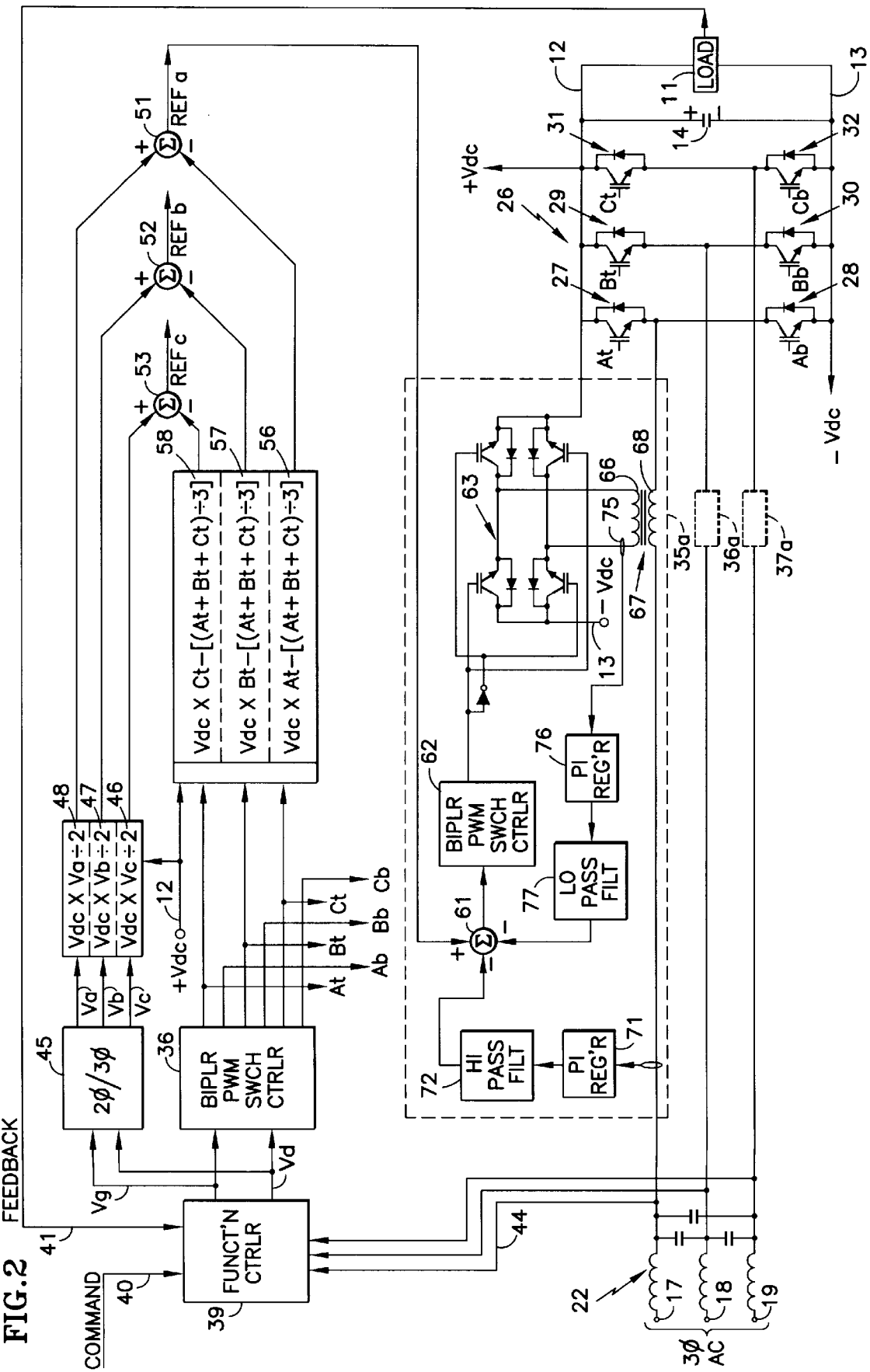
FIG. 2 is a schematic block diagram of one embodiment of the present invention.

Referring to FIG. 2, instead of the passive, reactive filters 35–37 of FIG. 1, the present invention employs active filters 35a, 36a, 37a, only the details of active filter 35a being shown, the details of the other active filters 36a, 37a being identical therewith. The switches 27–32 of the bridge 26 are controlled by signals At, Bt, Ct, for the top half of the bridge, and signals Ab, Bb, Cb, for the bottom half of the bridge, which are generated by a conventional bipolar pulse width modulation (PWM) switch controller 36. The switch controller 36 responds to conventional d and q voltage components Vd, Vq, provided by a function controller 39 that compares a command on a line 40 with feedback on a line 41 from the load 11. As an example, the feedback might be from a tachometer on an elevator motor that provides information which is converted into speed and position, so that the function controller can provide the d and q voltage signals indicative of the response required in order to suit the command on the line 40. The function controller is synchronized with the three-phase AC input by signals on lines 44. The switch controller 36 and function controller 39 can be any suitable controller commonly known in the prior art. The description thus far is of conventional circuitry, equally applicable to the circuitry of FIG. 1. Instead of a six pulse PWM switch controller 36, the invention may be employed with a twelve pulse PWM switch or an AC/DC matrix converter as disclosed in commonly owned copending U.S.

patent applications Ser. No. 09/310,600, filed May 12, 1999 and Ser. No. 09/310,393 filed May 12, 1999, with suitable adjustment to the synthesized waveform.

Figure 3:
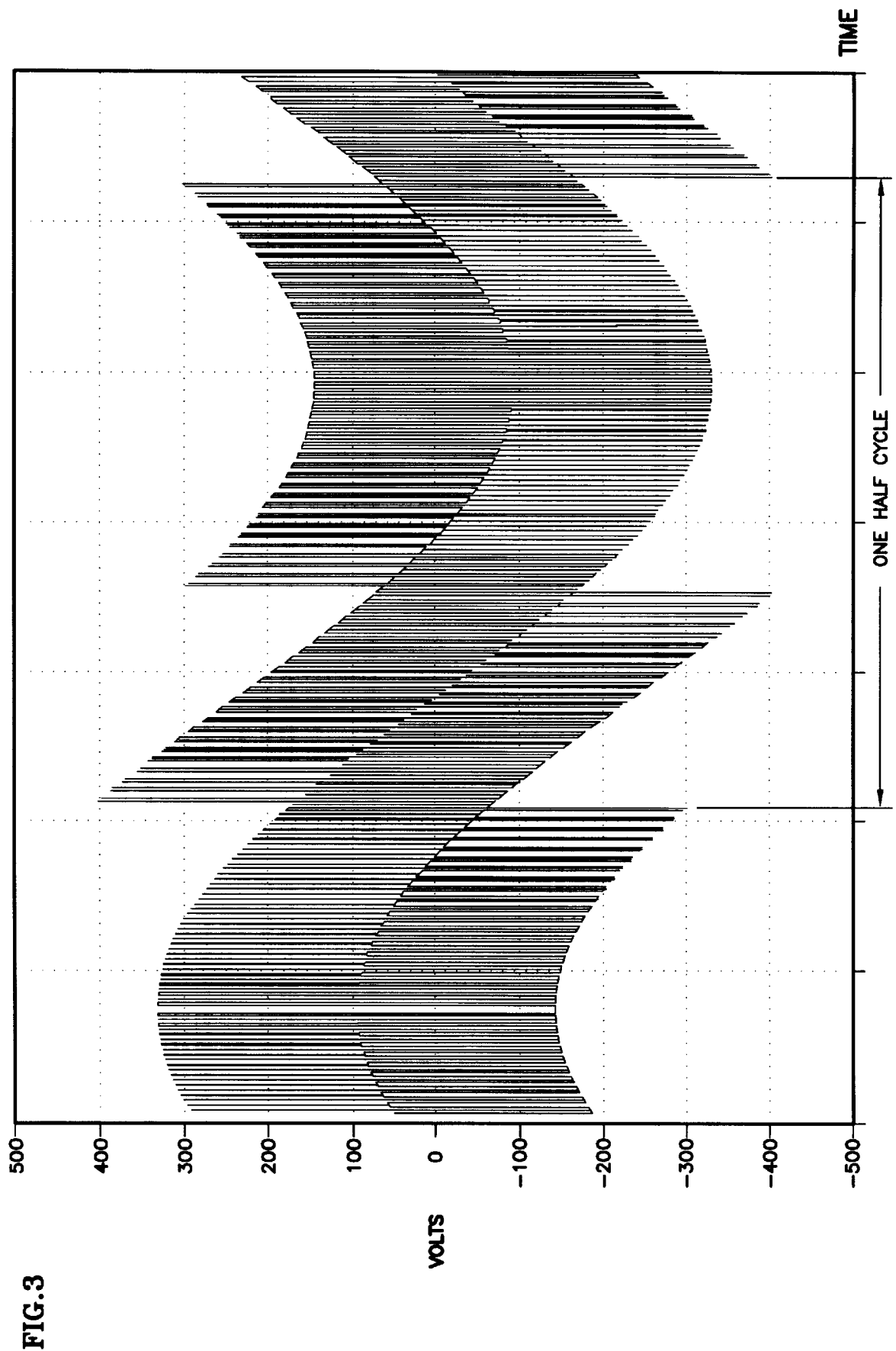
FIG. 3 is a waveform of the voltage required to cancel unwanted current producing voltage components in the mains feeding a switched AC/DC converter, according to the invention, superposed on the fundamental (50 or 60 Hz) switching voltage, for reference.
Figure 4:
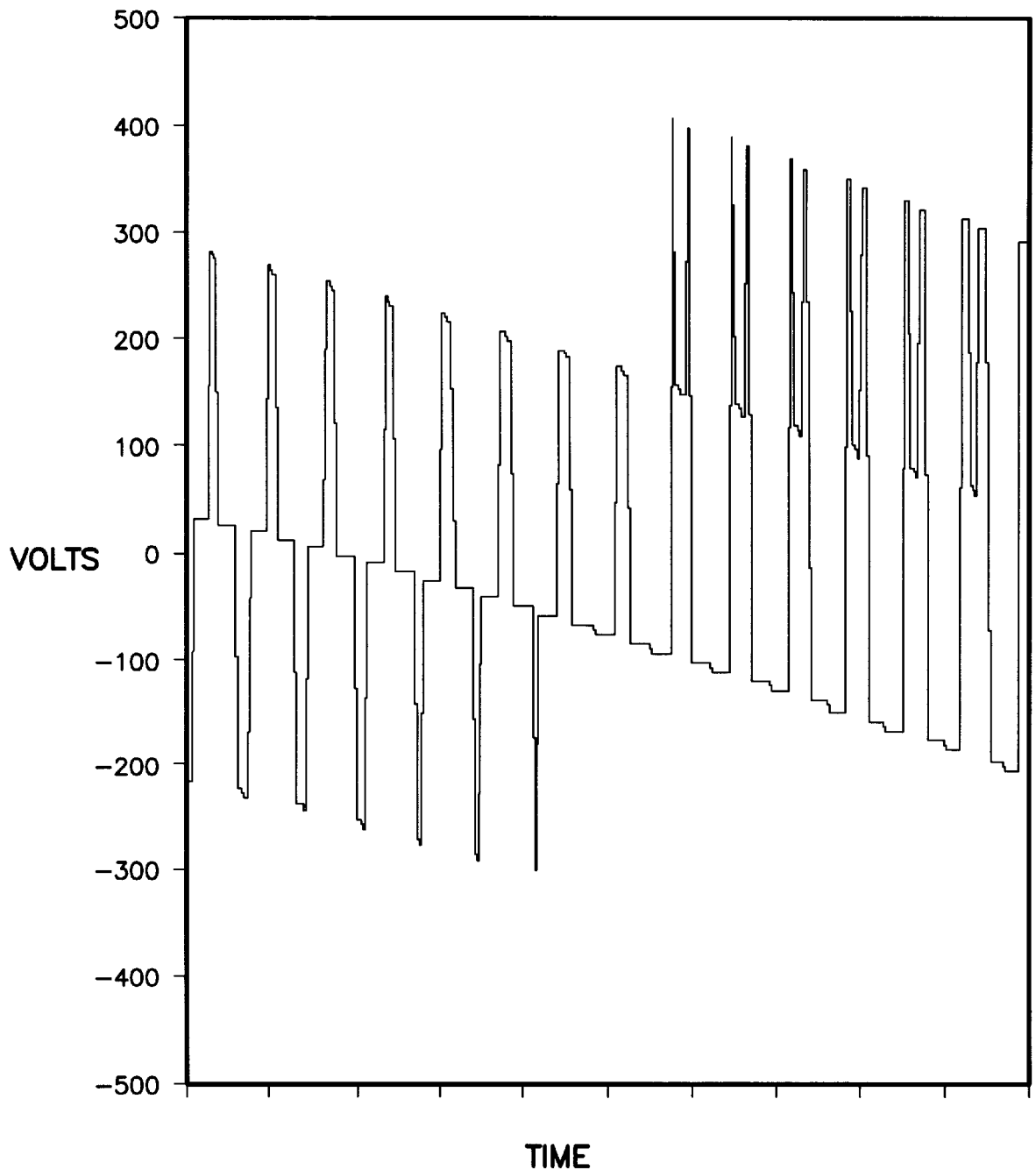
FIG. 4 is a partial, detailed view of the waveform of FIG. 3, to a different scale.

According to the invention, a reference voltage waveform for each phase, which for phase A is referred to as "Ref a", is summed degeneratively into the input current to substantially cancel unwanted current components resulting from switching of the IGBTs 27–32. The d and q voltage components from the function controller 39 are converted into three phase signals Va, Vb, Vc (which are the conventional phase input voltages in stationary coordinates) by a conventional two-phase to three-phase conversion 45, and those signals are multiplied by the DC voltage across the capacitor bank 14, Vdc, and divided by two, in related circuits or software segments 46–48. The result is applied positively to a corresponding summer 51–53, which may be implemented in hardware or software. The negative input to the summers 51–53 each come from corresponding circuits or software segments 56–58, each of which multiplies the corresponding top switching signal At, or Bt, or Ct, by Vdc, and then subtracts from that, the average of all three top switching signals. The result is the reference waveform, such as Ref a, which is applied to the positive input of a summer 61, and similar summers for phases B and C (not shown). The functions 56–58 may respond to bottom signals Ab, Bb, Cb instead of top signals, provided the phase difference is accommodated. The output of the summer 61 is applied to a conventional bipolar pulse width modulation switch controller 62, the output of which drives a four element H bridge 63, to convert the control voltage (<one volt at the output of the summer 61) to the same voltage level (e.g., several hundred volts) as the switching carrier frequency voltage components which are to be cancelled. The H bridge 63 and the bipolar pulse width modulation switch controllers 62 and 39 may either be conventional over-the-counter chips or conventional over-the-counter software. As is known, as long as the switching frequency of the H bridge is at least several times higher, any frequency can be synthesized. The bridge 63 drives a primary 66 of a transformer 67, the secondary 68 of which is connected between the input LC filter 22 and the IGBT bridge 26. The ideal waveform of a voltage to be applied across the secondary 68 which would completely cancel the unwanted switching carrier frequency voltage components in the AC mains current is shown in FIGS. 3 and 4, superposed on the fundamental voltage (50 or 60 Hz, usually), so as to present it in a related fashion. However, since the waveform synthesized by the functions 46–48 and 56–58 is only an approximation of the desired waveform due to delays and distortions, secondary feedback is provided by a current sensor 71 feeding a conventional proportional/integral regulator, the output of which is passed through a high pass filter 72 and applied as negative feedback to the summer 61. In order to prevent the resulting fundamental current components (usually 50 Hertz or 60 Hertz) from overpowering the active filter circuitry and requiring high current carrying components, additional feedback is provided by a current sensor 75 which feeds a conventional proportional/integral regulator 76, the output of which is passed through a low pass filter 77 to provide negative feedback to the summer 61. The transformer 67 must be a high power, high Q, broad band transformer, and the secondary polarity is selected so that the voltage waveform introduced by it will cancel the switching carrier frequency voltages generated by the bridge 26.

FIG. 5 is a simplified illustration of how the invention operates. In FIG. 5, illustration (a) shows various voltages, approximately to scale, including the fundamental power voltage 80 (typically at 50 or 60 Hertz) and the switching carrier voltage 82, with sidebands, which may be on the order of 7.2 kHz as an example. In illustration (b), the active filter synthesized voltage 83 is shown dotted, so as to emphasize the fact that it is introduced 180° out of phase with respect to the switching carrier frequency voltage components shown in illustration (a), along with the H bridge switching carrier frequency voltage 85, which may be on the order of 40 kHz, and its sidebands. Illustration (c) shows that when they are combined, by having each synthesized wave inserted into the corresponding phase, such as by the secondary 68 in phase A, the synthesized wave cancels the primary switching carrier frequency voltage 82, leaving only the fundamental voltage 80, and the active inductor switching carrier frequency voltage 85 at around 40 kHz. Although the magnitude of the active filter carrier frequency voltage 85 is no smaller than the magnitude of the main switching carrier frequency voltage 82, the passive filter components, such as the input LC filter 22, will provide an attenuation of the 40 kHz switching carrier frequency voltage 85 which is almost an order of magnitude greater than the attenuation of the 7 kHz carrier voltage 82. This is a prime feature of the invention.

The aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An active filter for reducing switching carrier currents between three-phase AC mains and an AC/DC switched bridge converter, said active filter comprising:

a transformer for each phase of said AC mains, each transformer having a primary winding and having a secondary winding connected between the corresponding phase of said AC mains and a related node of said converter;

means for synthesizing a voltage waveform for each of said phases, each synthesized waveform being substantially identical to the actual waveform of switching carrier frequency voltage generated by said converter in the related phase; and a plurality of pulse width modulation controllers, each connected to drive one of said primaries in response to a corresponding one of said synthesized voltage waveforms;

each of said secondaries being poled so that the voltage across it is substantially 180° out of phase with the corresponding one of said switching carrier frequency voltages.

2. An active filter according to claim 1 wherein:

each said synthesized voltage waveform is synthesized at least in part in response to switching signals, corresponding to each of said phases, provided to said converter.

3. An active filter according to claim 2 wherein:

each said synthesized voltage waveform includes a component which is the product of the converter DC output voltage times one of said switching signals for the corresponding phase, minus the average of said switching signals for all three of said phases.

4. An active filter according to claim 1 wherein:

each said synthesized voltage waveform includes a component equal to one-half of the product of the corresponding phase of AC mains voltage in stationary coordinates times the converter DC output voltage.

5. An active filter according to claim 4 wherein:

each said synthesized voltage waveform comprises a component equal to (A) one-half of (1) the product of the corresponding phase of AC mains voltage in stationary coordinates times (2) the converter DC output voltage minus (B) a component which is (3) the product of (a) the converter DC output voltage times (b) one of said switching signals for the corresponding phase, minus (4) the average of said switching signals for all three of said phases.

6. An AC/DC switched bridge converter in combination with an active filter according to claim 1.

7. An AC/DC switched bridge converter according to claim 6 wherein said switched bridge converter is a pulse width modulated converter.

8. An active filter according to claim 1 further comprising:

a high pass filter for each of said phases, each high pass filter responsive to current in a corresponding one of said primaries; and wherein:

each of said pulse width modulation controllers is responsive to the corresponding one of said synthesized voltage waveforms minus the output of the corresponding one of said high pass filters, whereby to compensate for irregularities in the voltage waveform of said AC mains.

9. An active filter according to claim 1 further comprising:

a low pass filter for each of said phases, each low pass filter responsive to current in a corresponding one of said secondaries; and wherein:

each of said pulse width modulation controllers is responsive to the corresponding one of said synthesized voltage waveforms minus the output of the corresponding one of said low pass filters.

10. A method of reducing switching carrier current components in three-phase AC mains connected to an AC/DC switched bridge converter, comprising:

utilizing the active filter of claim 1, (a) synthesizing a voltage waveform for each of said phases, each synthesized waveform being substantially identical to the waveform of switching carrier frequency voltage generated by said converter in the related phase and (b) introducing each said synthesized voltage waveform in series with, but of opposite phase to that of, said switching carrier frequency voltage of the corresponding phase.

11. A method of reducing switching carrier current components in three-phase AC mains connected to an AC/DC switched bridge converter, comprising:

(a) synthesizing a voltage waveform for each of said phases, each synthesized waveform being substantially identical to the waveform of switching carrier frequency voltage generated by said converter in the related phase and (b) introducing each said synthesized voltage waveform in series with, but of opposite phase to that of, said switching carrier frequency voltage of the corresponding phase.

12. A method according to claim 11 comprising:

synthesizing each said synthesized voltage waveform at least in part in response to switching signals corresponding to each of said phases provided to said converter.

13. A method according to claim 11 comprising:

synthesizing each said synthesized voltage waveform with a component which is the product of the converter DC output voltage times one of said switching signals for the corresponding phase, minus the average of said switching signals for all three of said phases.

14. A method according to claim 11 comprising:

synthesizing each said synthesized voltage waveform with a component equal to one-half of the product of the corresponding phase of AC mains voltage in stationary coordinates times the converter DC output voltage.

15. A method according to claim 11 comprising:

synthesizing each said voltage waveform with a component which is the product of the converter DC output voltage times the one of said switching signals for the corresponding phase, minus the average of said one switching signal for three of said phases subtracted from a component equal to one-half of the product of the corresponding phase input voltage in stationary coordinates times the converter DC output voltage.

* * * * *